Nov. 5, 1957    L. SCHIEBER, JR    2,812,485
TACHOMETER GENERATOR DAMPED SERVO SYSTEM
Filed Oct. 5, 1954    3 Sheets-Sheet 1

*INVENTOR.*
LEONARD SCHIEBER, Jr.
BY
*ATTORNEY*

Nov. 5, 1957  L. SCHIEBER, JR  2,812,485
TACHOMETER GENERATOR DAMPED SERVO SYSTEM
Filed Oct. 5, 1954  3 Sheets-Sheet 2

*INVENTOR.*
LEONARD SCHIEBER, Jr.
BY
*P. E. Henninger*
ATTORNEY

*INVENTOR.*
LEONARD SCHIEBER, Jr.

United States Patent Office 2,812,485
Patented Nov. 5, 1957

2,812,485

TACHOMETER GENERATOR DAMPED SERVO SYSTEM

Leonard Schieber, Jr., Johnson City, N. Y., assignor to International Business Machines Corporation, New York, N. Y., a corporation of New York Application October 5, 1954, Serial No. 460,334

20 Claims. (Cl. 318—448)

This invention relates to servo systems generally, and more specifically to electric motor servo systems. The invention is concerned with providing an improved servo system having better response characteristics than have been heretofore obtainable.

In prior servo systems where speed of response is a desirable factor, the ability to gain maximum speed in responding to an error signal, in fixed damping systems, has been, of necessity, a compromise between a system that is overdamped and one that is underdamped. For example, in an overdamped servo system the response is smooth but the rise time in arriving at the new value is high. In an underdamped servo system, the rise time is much smaller in arriving at the new value, but overshooting occurs and considerable time is required for the system to finally settle at the new value. Little is saved in the way of speed of response in either case. In a compromise system, the rise time in approaching the new value is less than in the overdamped system, but more than in the underdamped system. However, although it settles to within a specified range of values on either side of the new value before either the underdamped or overdamped systems, the results are not a marked improvement.

Consequently, it is an object of this invention to provide a servo system having a minimum rise time and extremely low settling time to thereby provide a maximum speed of response combined with stability, by varying the damping of the system in a continuous manner as a function of the error signal.

Another object of the present invention is to provide a servo system in which the system damping, during a step change of position, goes from a minimum to a maximum as the error signal goes from a maximum to a minimum.

Another object of this invention is to provide a servo system which may employ relatively low gain amplifiers so as to avoid saturation effects due to noise, phase change, etc.

Another object of this invention is to provide a servo system having improved stability at the null point so that the effect of back lash in the gearing may be greatly minimized.

Briefly, this invention is concerned with a servo system having an error signal, motive means controlled by said error signal, a generator driven by said motive means, and a feedback signal produced by said generator. In such a system there is the combination which comprises dynamic means for controlling the excitation of said generator as a function of said error signal in order to produce variable damping.

Certain embodiments of the invention are described in detail below and illustrated in the drawings in which.

Figure 1:
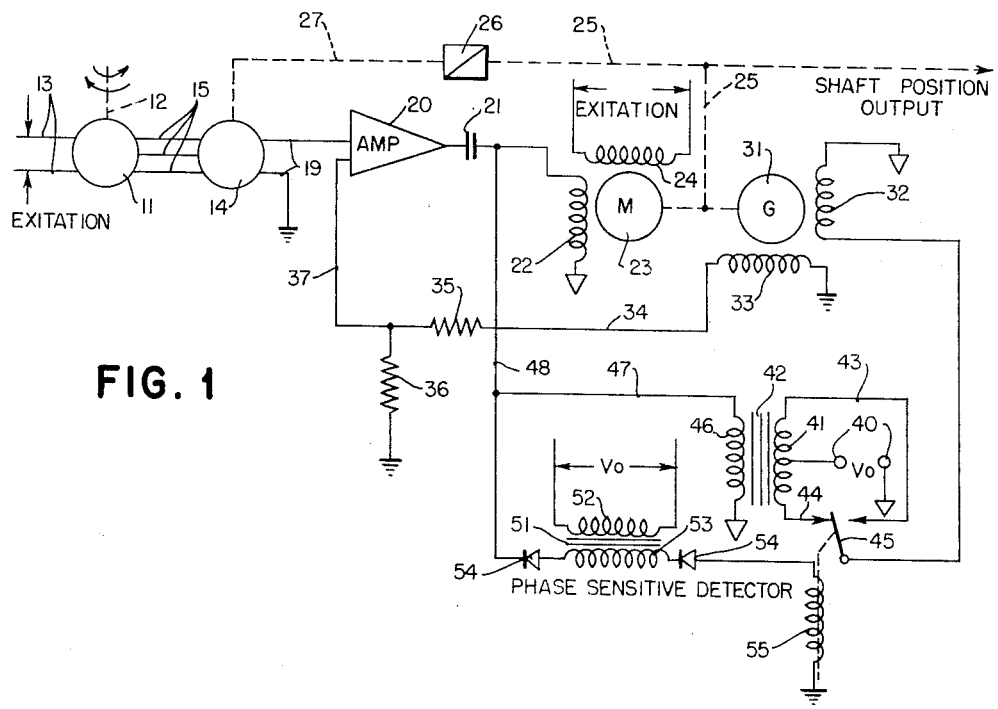
Fig. 1 is a circuit diagram showing a servo system embodying the invention.

In Fig. 1 there is illustrated a servo system which embodies one manner of applying this invention to such a system. The conventional elements of this servo system will first be generally described. The system is one employing so-called synchros, where the remotely controlled or following element is driven by an external source of power.

There is a signal generator 11 that is a well-known type of rotary electrical machine, having an input shaft 12 which may be rotated in either direction. The excitation for this generator is supplied as indicated by a pair of wires 13. Connected electrically to signal generator 11 there is a control transformer 14 that is a similar type of rotary electrical machine as signal generator 11 and has a group of corresponding wiring for electrically joining the signal generator 11 to the control transformer 14. These corresponding windings are joined electrically by a group of three wires 15 in the usual manner. In control transformer 14 there is an output winding (not shown) in which there is produced an error signal at a pair of wires 19, one of which is connected to ground, as illustrated, and the other of which leads to a summing amplifier 20. The output of amplifier 20 is fed via a coupling or tuning condenser 21, to a control winding 22 of a motor 23. The motor 23 has an excitation winding 24, as indicated, and is driven when a signal is received from the control transformer 14 via amplifier 20 and the circuit leading to winding 22 of the motor. When the motor is thus energized, it drives via a mechanical connection 25 including a gear reduction box 26 to position a shaft 27 of the control transformer 14. The arrangement is such that the motor 23 is driven in a direction to cause shaft 27 to turn so as to follow in a corresponding manner the rotation of input shaft 12 of the signal generator 11. When the shaft 27 of control transformer 14 is in a corresponding position to shaft 12 of signal generator 11, the error signal from control transformer 14 is reduced to zero, or a minimum, and the motor 23 will come to rest. Of course if input shaft 12 is continuously rotating, the shaft 27 of control transformer 14 will be driven to rotate correspondingly, as nearly as possible, in an exactly following manner. In order to provide the necessary stability for such a servo system, there is included in a well-known manner a generator 31 that is driven directly by the motor 23, said generator having an excitation winding 32 and an output winding 33. This generator 31 creates a signal in its output winding 33 which is fed back via wire 34 and an attenuation network, including resistors 35 and 36, and a wire 37 to the input of amplifier 20. This generator feedback signal is connected to be degenerative in the system, in order to provide the necessary damping for preventing undue oscillation in the response of the system.

In such a servo system as just described above, a continuously variable or dynamic damping that is dependent upon the error signal may be had by means of the following arrangement: Connected to the excitation winding 32 of the tachometer generator 31, there is a given fixed voltage introduced at a pair of terminals 40, which voltage is designated $V_0$. This excitation voltage is introduced via a center tapped secondary winding 41 of a transformer 42 and over one or the other of a pair of wires 43 and 44 to the stationary contacts of a relay switch 45, for reasons to be more fully set forth below. A primary winding 46 of the transformer 42 is connected via wires 47 and 48 to the output circuit of the amplifier 20, while the other side of the winding 46 is connected to ground, as illustrated, for a complete circuit.

Consequently, the output error signals as amplified by the amplifier 20 are fed to the primary winding 46 of transformer 42 so as to modify the excitation voltage $V_0$ in one half or the other of secondary winding 41, as well as to energize the motor 23. Thus the energizing voltage $V_0$ for the excitation of generator 31 is introduced at terminals 40 and is modified by superposing the error signal through transformer 42.

Since the error signal may reverse in sense and since the excitation of the generator 31 must be maintained always in the same sense, an arrangement must be had for reversing the sense of the superposition of the error signal on the excitation voltage $V_0$ so as to always obtain amplifier output voltage minus $V_0$. One manner of accomplishing this is that illustrated, which employs a phase sensitive detector as indicated, and includes a transformer 51 having a primary winding 52 and a secondary winding 53. A voltage corresponding to the excitation voltage $V_0$ (i. e. the same voltage $V_0$ or one derived from the same source) is introduced to the primary winding 52 as indicated. In series with the secondary winding 53 of the transformer 51 there is a pair of rectifiers 54 and a solenoid, or control winding, 55 of the relay switch 45. In this manner, since the excitation for signal generator 11 and voltage $V_0$, which excites the generator 31, are both in phase, the arrangement is such that when the phase or sense of the error signal reverses, it will cause the actuation of relay switch 45 by energization of its winding 55 so as to throw the switch 45 from the illustrated position to the other contact connected to the wire 43 for making a circuit with the wire 43 and the upper half of secondary winding 41 of the transformer 42. In this manner, whenever the sense of the error signal reverses from a given sense, solenoid 55 of switch 45 will be energized, and the switch 45 will reverse so that the effect on the excitation of winding 32 will remain the same in magnitude regardless of the signal reversal.

To this point in the description the manner of applying a voltage to excitation winding 32 has been explained. This voltage is equal to $V_0$ minus the error signal out of amplifier 20. The voltage $V_0$ is set to be equal in magnitude to the magnitude of the error signal from the amplifier at saturation. Thus, the damping is brought to a minimum or zero when the error is a maximum. Suppose that an error signal is developed out of control transformer 14 due to rotation of shaft 12. This error signal saturates the amplifier and provides a maximum error signal to motor winding 22 and the variable damping circuit between wire 48 and the excitation winding 32. Since this error signal is the maximum amplifier output and thus equal to $V_0$, no voltage is applied to winding 32. However, the motor receives a maximum voltage and can run at full speed to give a fast rise time. The motor drives shaft 27 to reduce the error signal input to the amplifier. At the time this error signal input becomes low enough to reduce the output voltage from amplifier 20 below the saturation level, a voltage begins to build up on winding 32, this voltage being equal to $V_0$ minus the amplified error signal voltage. Thus, a voltage is induced into winding 33 and fed back to amplifier 20. This signal subtracts from the error signal from control transformer 14 and provides damping for the system. The magnitude of the voltage fed back to the amplifier is dependent on the voltage applied to winding 32 as well as the speed at which the rotor of the generator is turned. Thus, the damping is zero until the amplifier output goes below the saturation level and from this point to the null, damping increases to a maximum through an infinite number of steps. This is due to the fact that the voltage applied to winding 32 to provide damping increases as the error signal decreases.

Figure 3:
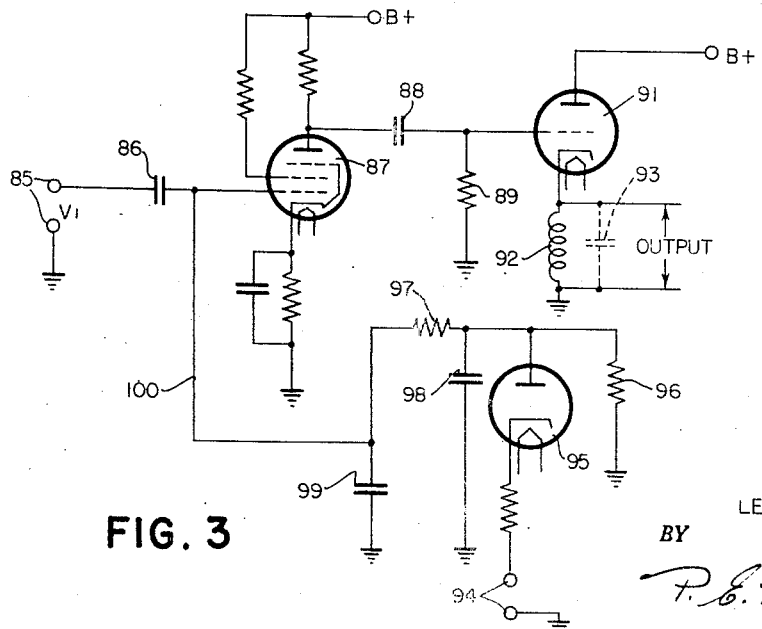
Fig. 3 is a detailed circuit diagram showing one of the elements of the system illustrated in Fig. 2.
Figure 2:
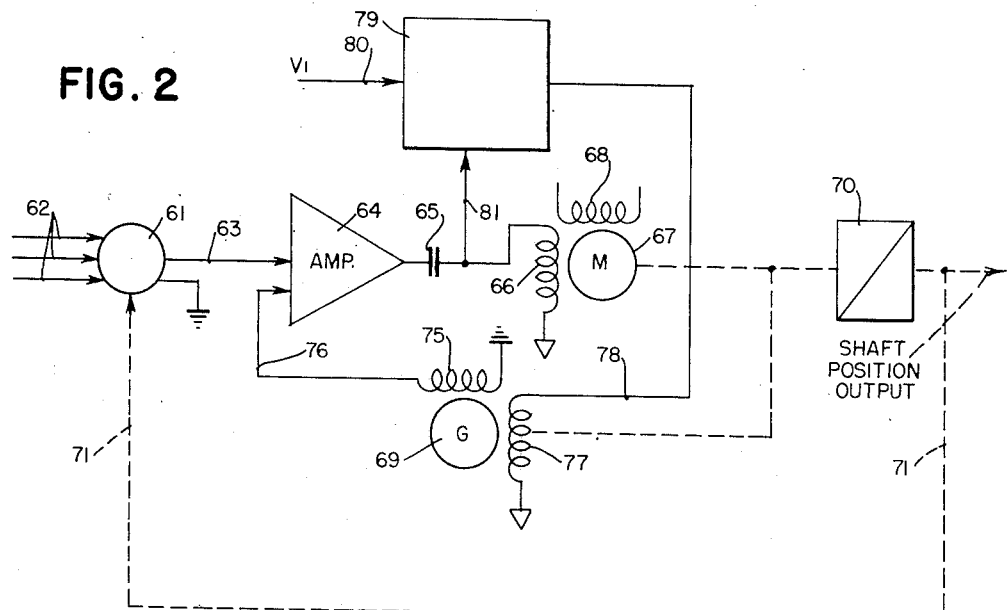
Fig. 2 is a circuit diagram illustrating another embodiment of the invention.

Another way of accomplishing the desired dynamic damping control according to this invention is illustrated in Fig. 2. The similar elements will be evident. A control transformer 61 is illustrated, having the usual Y-connection shown by three wires 62 which lead from the signal generator (not shown) for setting up an electromagnetic field in a well known manner. This field reacts with an output winding (not shown) to produce the usual error signal in the control transformer 61. The error signal from control transformer 61 is fed over a wire 63 to the input of a summing amplifier 64. The output of summing amplifier 64 is fed via a condenser 65 to a control winding 66 of a motor 67. The motor 67 also has a conventional excitation winding 68. As before, there is a mechanical connection from the motor 67 to a generator 69, and also via a gear reduction 70 to a shaft 71 of the control transformer 61. The generator 69 has an output winding 75 that is connected to the input of the amplifier 64 via a wire 76 as illustrated. This circuit may include an attenuation network (not shown), such as the resistors 35 and 36 of Fig. 1, if desired. An excitation winding 77 of the generator 69 is connected via wire 78 to the output of an amplifier 79 that is illustrated in a block form. The details of amplifier 79 are illustrated in Fig. 3, but the general operation of the system will first be described in connection with Fig. 2. In this system a fixed excitation voltage $V_1$, as indicated, is introduced via an input wire 80 to the amplifier 79, and the output of the amplifier 79 is fed over wire 78 to the excitation winding 77 of the generator 69. The variable control of the damping for the system, is gained by an automatic damping control circuit to be described in more detail below. This damping control circuit takes its control from the error signal as introduced to the control winding 66 of the motor 67 via a wire 81 leading to the amplifier 79, as shown.

It will be noted that the operation of this system is similar to that of Fig. 1, such that the amplitude of the energization of the excitation winding 77 of generator 69 is variably controlled as a function of the error signal, which signal originates at control transformer 61 and is amplified by amplifier 64. In this manner the introduction of an error signal will affect the amount of energization of excitation winding 77 of the generator 69. This effect will be such as to reduce the amount of negative feedback signal from the output of winding 75 of the generator 69, and consequently will reduce the amount of damping in the system. This will allow the system to act as rapidly as possible in reducing the error signal, so as to give a maximum speed in reaching a null in responding to any given error signal. However, as the error signal is reduced, its effect on the excitation of generator 69 will be correspondingly increased so that the negative feedback from the output winding 75 of the generator 69 will be increased and the damping correspondingly will increase in such a manner that the system can, in effect, "put on the brakes" and avoid overshooting or oscillating about the desired zero or minimum error signal position. In other words, the damping of the system will be dynamically varied as a function of the error signal, and the damping will be high at low amplitude error signals.

Referring to Fig. 3, it will be evident that the amplifier circuit there illustrated may be incorporated in Fig. 2, as the amplifier 79 of Fig. 2. The input voltage $V_1$ (that is indicated in Fig. 2 as being introduced by wire 80) is indicated in Fig. 3 and is introduced at a pair of terminals 85. The circuit for introduction of this excitation voltage $V_1$ may be followed via a coupling condenser 86 to the control grid of a pentode electronic tube 87. The electronic tube used should be capable of operation over a wide range of variations in transconductance and grid bias voltages. The output of pentode 87 is coupled in the usual manner via a condenser 88 and a resistor 89 to the control grid of a triode 91. The output voltage of triode 91 is then carried to the excitation winding 77 (Fig. 2) via the indicated circuit marked "output" in Fig. 3, that shows a winding 92 and a condenser 93 in parallel. It will be clear to one skilled in the art that winding 92 might be the excitation winding 77 of the generator 69 illustrated in Fig. 2. However, most likely the coil 92 will be employed to match the impedance of the output (winding 77 of generator 69) to triode 91, in which case condenser 93 would be omitted.

The introduction of the error signal, from the system of Fig. 2, is accomplished at a pair of terminals 94 (Fig. 3) that are located in series with a diode rectifier 95. Rectifier 95 is connected to a demodulator circuit, including resistors 96 and 97 as well as condensers 98 and 99. The output of this demodulator network is carried to the control grid of pentode 87 via wire 100, so that the error signal creates a variation in the bias of pentode 87 which varies the gain of the amplifier, including pentode 87 and triode 91. This variation in the bias on pentode 87 varies the transconductance of this tube and thus varies the gain thereof. In this manner the error signal is introduced at terminals 94 will vary the bias of pentode 87 according to the amplitude of the error signal and irrespective of the sense or phase thereof. Consequently, the energization of winding 77 (Fig. 2) of the generator 69 is controlled as a function of the error signal (as fed to control winding 66 of the motor 67) since this error signal is carried to the amplifier 79 via wire 81. It will be clear to one skilled in the art that the wire 81 indicates a connection of the error signal to terminals 94 of Fig. 3. Likewise, the indication of fixed excitation voltage $V_1$ as introduced via wire 80 in Fig. 2 is actually connected to terminals 85 in Fig. 3.

Figure 5:
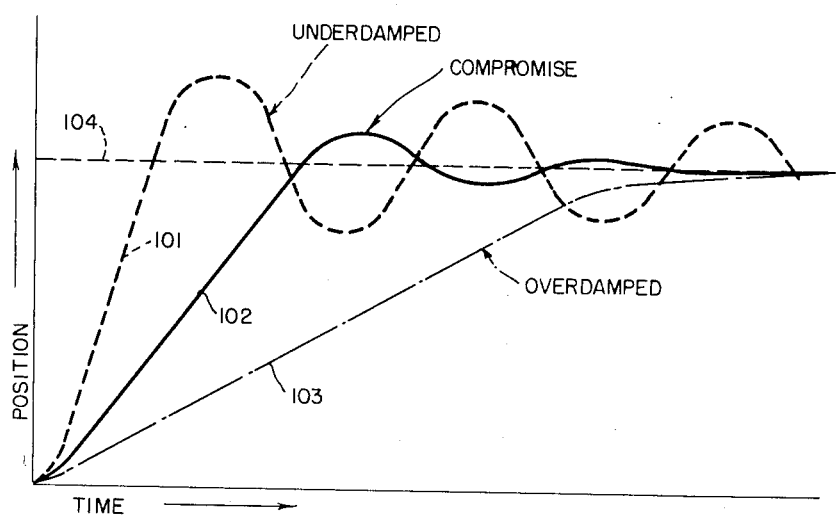
Fig. 5 is a graphical showing of the response characteristics of some prior servo systems.
Figure 6:
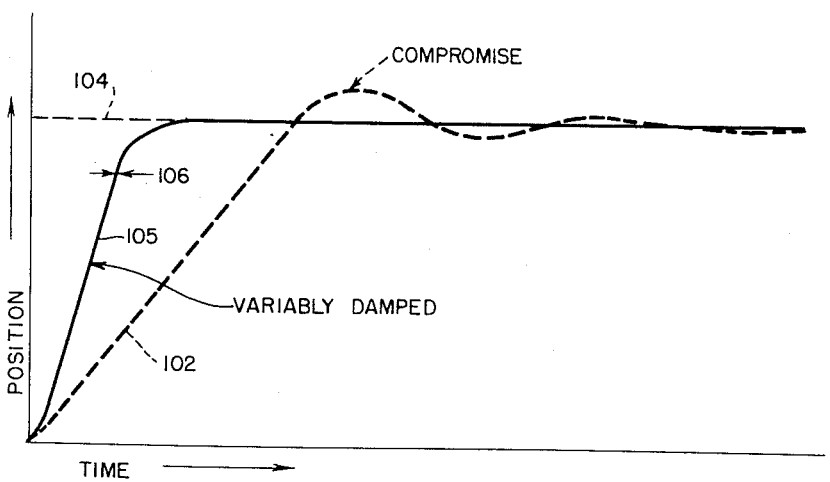
Fig. 6 is a graphical showing of the response of a servo system embodying this invention, in comparison with one of the prior art systems.

Figs. 5 and 6 illustrate graphically the improved speed of response of a servo system according to this invention over prior systems. In Fig. 5 there are shown three response curves 101, 102 and 103. These curves are also labeled, and show the response characteristics for three constant-damped servo systems, one underdamped, one a compromise and one overdamped respectively. It will be noted that the underdamped system will be very slow in settling down to within tolerable limits of the desired output position (illustrated by a dotted line 104). Furthermore, the compromise system is only slightly faster than the overdamped system in reaching the condition of remaining within tolerable limits of the desired output position.

By referring to Fig. 6, however, it will be observed that a curve 105 illustrates the response of a variably damped servo system according to this invention. The curve 102 for a compromise constant-damped system is superimposed onto Fig. 6 to make a more exact comparison. It will be noted that the response curve 105 illustrates how much faster a variably damped servo system reaches and remains at the desired output position 104. In addition, it will be observed that by employing certain values for the various elements in the system, the response will be such that no damping will be present at all until the error signal reaches a predetermined small amplitude, as described above. Thus the servo system will run at full speed toward the desired position, until the predetermined amplitude error signal is reached (indicated by the point 106 on the curve 105) when the variable damping will become effective. Thus the system will quickly and smoothly reach the desired position without any oscillation.

Figure 4:
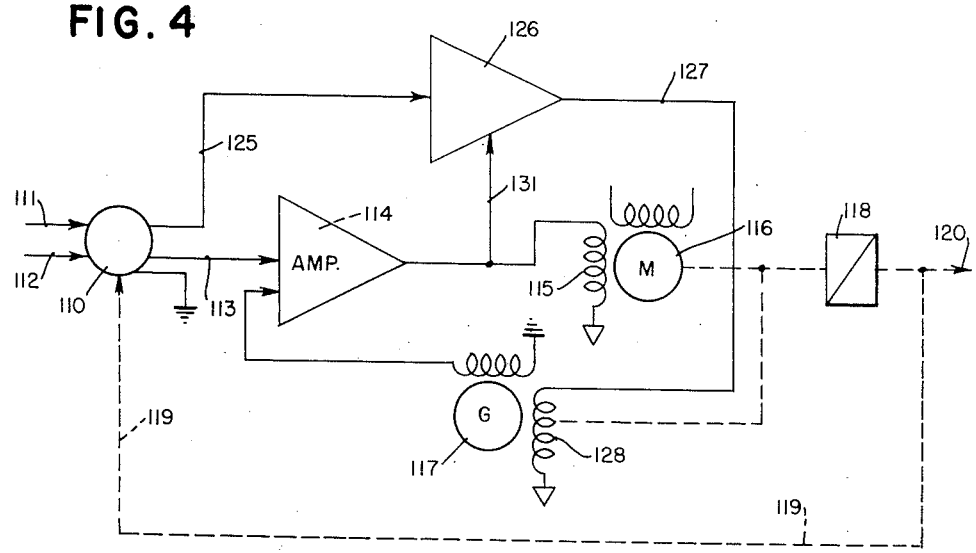
Fig. 4 is a circuit diagram illustrating another type of servo application embodying the invention.

Fig. 4 illustrates another servo application wherein the dynamic variable damping according to this invention is especially adaptable. Thus, the system illustrated in Fig. 4 is one employing a resolver 110. Such a resolver is a rotary electric machine having a plurality of windings and being arranged in such a manner that two input voltages may be applied, which voltages represent the two components of a given vector quantity. These voltages are then introduced to a pair of windings (not shown) that are situated at ninety electrical degrees to one another in a manner well known to this type of rotary machine. Of course, these windings each have a pair of terminals, but to simplify the showing, the input circuits for these two windings are illustrated as arrows 111 and 112.

As an example of a rotary electric machine of the type known as a resolver, reference is made to vol. 17, Components Handbook, M. I. T. Radiation Laboratory Series, McGraw-Hill Book Co., Inc., 1949, by Blackburn, where such a machine and its use in a servo system is described in some detail. Such a resolver may be used in the system of Fig. 4, as the resolver 110 there illustrated. There may be two separate outputs obtained from resolver 110, one of which will represent the magnitude of the vector quantity that the two input voltages (indicated by arrows 111 and 112) are components of. The other output will be a null or minimum signal when the rotor of the resolver 110 is rotated to an angular position representing the angle of the given vector quantity that the two components represent. The null producing one of these output windings is connected via a wire 113 to the input of a summing amplifier 114. Therefore, a null or minimum output signal will be carried via the wire 113 when the rotor of resolver 110 is in a position which represents the arctan of the two component voltages (111 and 112). In order to accomplish this, the output of amplifier 114 is fed to a control winding 115 of a motor 116. The motor 116 has the usual excitation winding as illustrated, and is connected directly to a tachometer generator 117. The motor 116 is also connected via a gear reduction 118 to a shaft 119 of the resolver 110. Shaft 119 may, of course, be extended, as indicated by an arrow 120 to position a given load in accordance with the relationship of the component voltages introduced at inputs 111 and 112. In such a system a second output winding is situated at ninety electrical degrees to the winding for the null output signal over wire 113, so as to produce a signal in a wire 125 that is fed to the input of another amplifier 126. It will be noted that the output of this other winding is proportional to the magnitude of the vector quantity being represented by the components that are introduced at inputs 111 and 112. The output of amplifier 126 is fed over a wire 127 to an energization winding 128 of the tachometer 117.

It will be noted that the operation of a servo system of the type illustrated in Fig. 4 is such that an error signal is introduced to the amplifier 114 via the wire 113. This error signal will cause the control winding 115 of the motor 116 to be energized and so the motor 116 will run in the proper direction to cause the shaft 119 of the resolver to be rotated until a minimum or null signal is produced, when the motor 116 will no longer be energized. Of course if the input component signals (represented by the arrows 111 and 112) are continuously changing, the motor 116 will continue to run in a direction tending to reduce the error signal to a null.

In this type of system, while the shaft 119 is being rotated to an angular position representing the angle whose tangent is that of the ratio of component voltages introduced as indicated by arrows 111 and 112, a compensation may be had for variations in the amplitude of both of the component voltages. Such compensation is known in this type of servo system. The compensation is readily available since such variations in the amplitudes of both component signals will be directly reflected at the output of the winding of resolver 110 in which the vector magnitude signal is produced. This signal is carried over the wire 125 and is amplified by amplifier 126 and fed to excitation winding 128 of the generator 117. Thus the excitation of the generator 117 will be varied in a manner to compensate for any variations in the amplitudes of input components that occur and are not due to the desired variations in the relative amplitudes of the components. This compensation is necessary since the main loop gain of the servo is proportional to the magnitude of the inputs, thus producing a need for a variation in generator output in order to maintain a given damping.

In order to introduce dynamic variable damping, the circuit according to this invention includes a connection 131 for introducing the error signal of the system (as introduced to control winding 115 of motor 116) to the amplifier 126 as an automatic variable damping control signal. In other words, amplifier 126 may take the form illustrated in Fig. 3 so that its output may be varied in accordance with the error signal output from amplifier 114 and thus the variable damping effect will be had as fully explained above.

It will be appreciated that the variable damping arrangement, according to this invention, may be applied in many ways to various servo systems. It will be noted that the use of such variable damping means for controlling the damping of servo systems makes possible a marked improvement in the dynamic performance of the servo system. For this reason the servo system may be designed to employ lower gain amplifiers and smaller servo motors because the ability to more rapidly respond to error signals is provided. Likewise, the stability of the system can be made less dependent on back lash in the gearing of the system by employing a lower gain in the error transducer such as the control transformer or the resolver of the servo systems described above. A servo system according to this invention will follow large input velocities accurately and a relatively ideal transient response is possible with no overshoot and with low response time.

While the invention has been particularly described employing alternating current devices, the concepts involved are equally applicable to servo systems employing direct current devices.

While certain embodiments of this invention have been described in detail in accordance with the applicable statutes, these are not to be taken as in any way limiting this invention but merely as being descriptive thereof.

It is claimed:

1. In a servo system having an error signal, motive means controlled by said error signal, a generator driven by said motive means, and a feedback signal produced by said generator, the combination comprising means for controlling the excitation of said generator as a function of said error signal in order to produce variable damping in the system.

2. In a servo system having an error signal, motive means controlled by said error signal, a generator driven by said motive means, and a feedback signal produced by said generator, the combination comprising an excitation winding for said generator, means for supplying a fixed excitation current to said winding, and means for superposing said error signal onto said fixed excitation means in opposition thereto in order to cause the resultant excitation to vary inversely as the amplitude of the signal.

3. In a servo system having an error signal, motive means controlled by said error signal, a generator driven by said motive means, and a feedback signal produced by said generator, the combination comprising an excitation winding for said generator, a circuit including said excitation winding and a source of fixed excitation, and means in said circuit for superposing said error signal onto said fixed excitation source in opposition to said fixed excitation in order to provide variable damping in the system.

4. In an electric servo system having an error signal, a motor controlled by said error signal, a generator driven by said motor, and a feedback signal produced by said generator, the combination comprising an excitation winding for said generator, a circuit including said excitation winding and a transformer winding and a fixed source of excitation, and another circuit including said error signal and a transformer winding inductively coupled to said first named transformer winding for superposing the error signal onto said fixed source of excitation in order to provide variable damping for the system.

5. In an electric servo system having an error signal, a motor controlled by said error signal, a generator driven by said motor, and a feedback signal produced by said generator, the combination comprising an excitation winding for said generator, an output winding on said generator for producing said feedback signal, a transformer having a primary winding and a center tapped secondary winding, circuit means including a fixed source of excitation supply and one half of said secondary winding, switch means for selecting a given half of said secondary winding for inclusion in said circuit, second circuit means for feeding said error signal through said primary winding, and comparison means for actuating said switch means to include the opposite half of said secondary winding upon a reversal in sense of the error signal.

6. In an alternating current servo system having a variable amplitude reversible phase error signal, a motor reversibly controlled by said error signal, a generator driven by said motor, and a feedback signal produced by said generator, the combination comprising an excitation winding for said generator, an output winding on said generator for producing said feedback signal, a transformer having a primary winding and a center tapped secondary winding, means for supplying an alternating current excitation signal having a constant amplitude and a given phase that is in phase with or one hundred and eighty degrees out of phase with said error signal, circuit means including said excitation supply means and one half of said transformer secondary winding, switch means for selecting a given half of said secondary winding for inclusion in said circuit, second circuit means for feeding said error signal through said primary winding, and phase sensitive detector means for actuating said switch means when said error signal has a given one of its two phases in order to correctly superpose said error signal upon said excitation to create variable damping in the system.

7. A feedback control system comprising an error signal, means responsive to said error signal, a feedback signal generator driven by said responsive means, excitation means for said feedback signal generator, and means for controlling the excitation of said feedback signal generator as a function of said error signal to provide variable damping by said system.

8. A feedback control system comprising an error signal, means responsive to said error signal, a feedback signal generator driven by said responsive means and having an excitation winding associated therewith, and circuit means including a connection to said error signal for controlling the excitation of said feedback signal generator by controlling the energization of said excitation winding.

9. A feedback control system comprising an error signal, motive means responsive to said error signal, a feedback signal generator driven by said motive means and having an excitation winding associated therewith, and circuit means including a connection to said error signal for controlling the excitation of said feedback signal generator by controlling the energization of said excitation winding.

10. A feedback control system comprising an error signal, a motor responsive to said error signal, a generator driven by said motor, excitation means for said generator, first circuit means for connecting the output of said generator degeneratively to the input of said motor to provide damping therefor, and second circuit means for connecting said error signal to said excitation means in order to dynamically vary the damping of said motor.

11. A feedback control system comprising an error signal, a motor responsive to said error signal, a generator driven by said motor, an excitation winding for said generator, an output winding with said generator, first circuit means for connecting said output winding degeneratively to the input for said motor to provide damping therefor, and second circuit means connecting said excitation winding to said error signal for providing variable damping of the motor as a function of said error signal.

12. In a servo system having an error signal, motive means controlled by said error signal, a generator driven by said motive means, and a feedback signal produced by said generator, the combination comprising an excitation winding for said generator, means for supplying excitation current to said winding including an amplifier having variable gain, and circuit means for connecting said error signal to said amplifier to vary the gain thereof in accordance with the amplitude of said error signal whereby the damping of the system is dynamically varied.

13. In a servo system having an error signal, motive means controlled by said error signal, a generator driven by said motive means, and a feedback signal produced by said generator, the combination comprising an excitation winding for said generator, means for supplying excitation current to said winding including an amplifier having variable gain, said amplifier including a variable transconductance element, means for varyng the transconductance thereof, an output amplification stage, an input circuit to said transconductance varying means, and circuit means for connecting said error signal to said input circuit in order to produce variable damping in said system.

14. In a servo system having an error signal, motive means controlled by said error signal, a generator driven by said motive means, and a feedback signal produced by said generator, the combination comprising an excitation winding for said generator, means for supplying excitation current to said winding including an amplifier having variable gain, said amplifier including a variable transconductance pentode having a control grid, a rectifier in series with an input circuit and connected to said control grid, a triode coupled to the output of said pentode, and circuit means for connecting said error signal to said input circuit in order to produce variable damping in said system.

15. In a servo system having an error signal, motive means controlled by said error signal, a generator driven by said motive means, and a feedback signal produced by said generator, the combination comprising an excitation winding for said generator, means for exciting said winding including an amplifier, said amplifier having excitation supply input terminals, a variable transconductance pentode having a plate and a control grid, said supply input terminals being coupled to said control grid, a rectifier and filter network having error signal input terminals and being coupled to said control grid to vary the bias thereof, a cathode follower coupled triode coupled between the plate of said pentode and said excitation winding, and a circuit for coupling said error signal to said error signal input terminals so that the damping of the system is variable as a function of the error signal.

16. In a triangle solving servo system employing a resolver and having an error signal, motive means controlled by said error signal, a generator driven by said motive means, and an excitation signal for said generator being directly related to said error signal, both said error signal and said excitation signal being derived from said resolver, the combination comprising an excitation winding for said generator, and circuit means for energizing said winding with said excitation signal including means for superposing said error signal in opposition to said excitation signal in order to provide variable damping in the system.

17. In a triangle solving servo system employing a resolver and having an error signal, motive means controlled by said error signal, a generator driven by said motive means, and an excitation signal for said generator being directly related to said error signal, both said error signal and said excitation signal being derived from said resolver, the combination comprising an excitation winding for said generator, an amplifier for said excitation signal, said amplifier having variable gain control, circuit means for connecting said excitation signal to said winding through said amplifier, and additional circuit means for connecting said error signal to said amplifier in order to control the gain thereof so as to provide variable damping in the system.

18. In a triangle solving servo system employing a resolver and having an error signal, motive means controlled by said error signal, a generator driven by said motive means, and an excitation signal for said generator being directly related to said error signal, both said error signal and said excitation signal being derived from said resolver, the combination comprising an excitation winding for said generator, an amplifier for said excitation signal, said amplifier including a variable transconductance element, means for varying the transconductance thereof, an output amplification stage, an input circuit to said transconductance varying means, circuit means for connecting said excitation signal to the input of said amplifier and for connecting said output stage to said excitation winding, and additional circuit means for connecting said error signal to said transconductance input circuit in order to provide variable damping in the system.

19. In a triangle solving servo system employing a resolver and having an error signal, motive means controlled by said error signal, a generator driven by said motive means, and an excitation signal for said generator being directly related to said error signal, both said error signal and said excitation signal being derived from said resolver, the combination comprising an excitation winding for said generator, an amplifier for said excitation signal, said amplifier including a variable transconductance pentode having a control grid, a rectifier in series with an input circuit and connected to said control grid, a triode coupled to the output of said pentode, circuit means for connecting said excitation signal to the control grid of said pentode and for connecting the output of said triode to said excitation winding, and additional circuit means for connecting said error signal to said input circuit in order to superpose the error signal onto said excitation signal so as to provide variable damping in the system.

20. In a triangle solving servo system employing a resolver and having an error signal, motive means controlled by said error signal, a generator driven by said motive means, and an excitation signal for said generator being directly related to said error signal, both said error signal and said excitation signal being derived from said resolver, the combination comprising an excitation winding for said generator, an amplifier for said excitation signal, said amplifier having excitation supply input terminals, a variable transconductance pentode having a plate and a control grid, said supply input terminals being coupled to said control grid, a rectifier and filter network having error signal input terminals and being coupled to said control grid to vary the bias thereof, a cathode follower coupled triode coupled between the plate of said pentode and said excitation winding, circuit means for connecting said excitation signal to said excitation supply input terminals, and additional circuit means for connecting said error signal to said error signal input terminals whereby dynamic variable damping of the servo system is had.

References Cited in the file of this patent
UNITED STATES PATENTS 2,654,999    Berge  ------------------ Oct. 13, 1953
2,674,708    Husted  ----------------- Apr. 6, 1954